(12) United States Patent
Cho et al.

(10) Patent No.: US 8,045,924 B2
(45) Date of Patent: Oct. 25, 2011

(54) APPARATUS AND METHOD FOR SCHEDULING USERS IN A MOBILE COMMUNICATION SYSTEM

(75) Inventors: Jeong-Woo Cho, Suwon-si (KR); Yong Chang, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 934 days.

(21) Appl. No.: 12/001,791

(22) Filed: Dec. 11, 2007

(65) Prior Publication Data

US 2008/0153530 A1 Jun. 26, 2008

(30) Foreign Application Priority Data

Dec. 11, 2006 (KR) .................. 10-2006-0125513

(51) Int. Cl.
*H04B 1/00* (2006.01)
(52) U.S. Cl. .... 455/63.1; 455/440; 455/450; 455/452.2; 455/509; 455/513; 370/331; 370/332
(58) Field of Classification Search .................. 455/507, 455/434, 445, 450, 452.1, 464, 442, 452.2, 455/509; 370/310, 336, 238, 252, 331
See application file for complete search history.

(56) References Cited

U.S. PATENT DOCUMENTS

| 6,449,490 | B1 * | 9/2002 | Chaponniere et al. | ........ 455/507 |
| 7,123,922 | B2 * | 10/2006 | Chaponniere et al. | ..... 455/452.2 |
| 7,155,246 | B2 * | 12/2006 | Bhushan et al. | .............. 455/509 |
| 7,542,765 | B2 * | 6/2009 | Kwun et al. | .................. 455/436 |

| 2004/0071110 | A1 | 4/2004 | Guey et al. | |
| 2007/0004415 | A1 * | 1/2007 | Abedi | .......................... 455/442 |
| 2007/0218918 | A1 * | 9/2007 | Liu et al. | ................... 455/452.1 |

FOREIGN PATENT DOCUMENTS

| EP | 1 653 762 | 5/2006 |
| KR | 1020010113744 | 12/2001 |
| KR | 1020020013791 | 2/2002 |
| KR | 1020030054344 | 7/2003 |
| KR | 1020060014544 | 2/2006 |

OTHER PUBLICATIONS

Aimin Sang et al.: "Downlink Scheduling Schemes in Cellular Packet Data Systems of Multiple-Input Multiple-Output Antennas", Global Telecommunications Conference, GLOBECOM '04, Nov. 29, 2004.
Lau V: "A Theoretical Framework of Uplink Macroscopic Optimization for Multicell Systems with Multiuser Detection", IEEE Transactions on Vehicular Technology, Nov. 1, 2004.

(Continued)

*Primary Examiner* — Temesgh Ghebretinsae
*Assistant Examiner* — April G Gonzales
(74) *Attorney, Agent, or Firm* — The Farrell Law Firm, P.C.

(57) ABSTRACT

An apparatus and method for scheduling users in a mobile communication system are provided, in which a Base Station (BS) calculates scheduling utility values of each Mobile Station (MS) for a plurality of cases of interference from neighbor BSs, forms a candidate MS list by selecting a predetermined number of MSs in a descending order of utility value for each of the cases of interference from the neighbor BSs, transmits the candidate MS list to the neighbor BSs, receives candidate MS lists from the neighbor BSs, calculates the channel transmission rates of candidate MSs included in the candidate MS lists, and selects an MS to be serviced according to the channel transmission rates.

20 Claims, 4 Drawing Sheets

OTHER PUBLICATIONS

Jeong-Woo Cho et al.: "Joint Network-wide Opportunistic Scheduling and Power Control in Multi-cell Networks", IEEE International Symposium on a World of Wireless, Mobile and Multimedia Networks, Jun. 1, 2007.

Saad G. Kiani et al.: "A Simple Greedy Scheme for Multicell Capacity Maximization", International Telecommunications Symposium, Sep. 1, 2006.

* cited by examiner

APPARATUS AND METHOD FOR SCHEDULING USERS IN A MOBILE COMMUNICATION SYSTEM

CROSS-REFERENCE TO RELATED PATENT APPLICATION

This application claims priority under 35 U.S.C. §119(a) to a Korean Patent Application filed in the Korean Intellectual Property Office on Dec. 11, 2006 and assigned Serial No. 2006-125513, the entire disclosure of which is hereby incorporated by reference.

BACKGROUND OF THE INVENTION

1. Field of the Invention

The present invention generally relates to an apparatus and method for scheduling users in a mobile communication system. More particularly, the present invention relates to an apparatus and method for scheduling users, taking into account inter-cell interference in a multi-cellular mobile communication system.

2. Description of the Related Art

A mobile communication system provides a variety of high-speed multimedia services to users on radio channels. These services have different Quality of Service (QoS) requirements. For instance, a real-time service such as a video call service is tolerant of transmission errors, although the service is sensitive to transmission delays. A service such as a file download service is opposite case in which it is delay-tolerant and error-sensitive. In this context, radio resources can be efficiently used by controlling data rates for different service types, taking into account the congestion of a wireless network. To do so, the mobile communication system adopts scheduling.

Scheduling is a scheme that efficiently utilizes radio resources by selecting a receiving user, a transmission time, and a data rate, upon requests for services from users. A criterion for the selection is fairness. Two popular notions for fairness are proportional fairness and max-min fairness. Proportional fairness is a form of fairness that allocates the same amount of radio resources to Mobile Stations (MSs) irrespective of the MSs channel statuses. For example, almost the same number of time slots are allocated to an MS in good channel status and an MS in poor channel status. The principle of max-min fairness is to allocate radio resources in such a way that the same amount of data is transmitted to MSs rather than the same amount of radio resources are allocated to them. That is, max-min fairness allocates the same data rate to the MSs. Because a wide range of maximum allowed data rates even with a ten-times difference can be supported for MSs, too many time slots may be allocated to an MS with a low data rate, compared to an MS with a high data rate. On the other hand, proportional fairness is not effective in ensuring QoS because it does not support a predetermined or higher data rate for each MS. To avert these problems, a Generalized Proportional Fair (GPF) scheduler has been proposed to achieve a good compromise between proportional fairness and max-min fairness. A major example of the GPF scheduler is a Proportional Fair (PF) scheduler discussed in U.S. Pat. No. 6,449,490 "Transmitter Directed, Code Division Multiple Access System Using Path Diversity to Equitably Maximize Throughput" filed on Sep. 10, 2002.

However, the PF scheduler is designed for a single cell, with no regard to inter-cell interference under a multi-cellular mobile communication environment. In a multi-cellular mobile communication system, an MS at a cell boundary often cannot receive a service due to interference from neighbor cells. Therefore, a fair service is not expected from the PF scheduler. Even if the MS receives the service, the MSs required QoS is not satisfied because of the neighbor-cell interference. As illustrated in FIGS. 1A and 1B, the neighbor-cell interference decreases a required QoS in the multi-cell mobile communication system. Referring to FIG. 1A, when an MS 104 serviced by a BS 100 (BS A) is located at the boundary of the service area 106 of BS A, a signal from a neighbor BS 102 (BS B) interferes with the MS 104. Due to the interference from BS B, the MS 104 fails to receive a service from BS A or if a service is received, the MS 104 receives the service with a degraded QoS. Referring to FIG. 1B, when an MS 107 serviced by a BS 101 (BS A) is located at the boundary of the service area 110 of BS A, signals from neighbor BSs 103 and 105 (BS B and BS C) interfere with the MS 107. Due to the interference from BS B and BS C, the MS 107 fails to receive a service from BS A or if a service is received, the MS 107 receives the service with a degraded QoS.

Accordingly, there exists a need for an apparatus and method for scheduling MSs, taking into account interference from neighbor cells, while supporting proportional fairness and max-min fairness in a multi-cellular mobile communication system.

SUMMARY OF THE INVENTION

An aspect of exemplary embodiments of the present invention is to address at least the problems and/or disadvantages and to provide at least the advantages described below. Accordingly, an aspect of exemplary embodiments of the present invention is to provide an apparatus and method for scheduling users in a multi-cellular mobile communication system.

Another aspect of exemplary embodiments of the present invention provides an apparatus and method for scheduling users, taking into account inter-cell interference in a multi-cellular mobile communication system.

A further aspect of exemplary embodiments of the present invention provides an apparatus and method for scheduling users, taking into account interference from neighbor cells, while supporting proportional fairness and max-min fairness in a multi-cellular mobile communication system.

In accordance with an aspect of exemplary embodiments of the present invention, there is provided a scheduling method of a BS in a mobile communication system, in which scheduling utility values of each MS are calculated for a plurality of cases of interference from at least one neighbor BS, a first candidate MS list is formed by selecting a predetermined number of MSs according to a utility value for each of the cases of interference from the at least one neighbor BS, at least one of a second candidate MS list is received from the at least one neighbor BS, channel transmission rates of candidate MSs included in the first candidate MS list and the at least one of the second candidate MS list are calculated, and at least one MS to be serviced is selected according to the channel transmission rates.

In accordance with another aspect of exemplary embodiments of the present invention, there is provided a scheduling apparatus of a BS in a mobile communication system, in which a candidate MS selector calculates scheduling utility values of each MS for a plurality of cases of interference from at least one neighbor BS, and forms a first candidate MS list by selecting a predetermined number of MSs according to a utility value for each of the cases of interference from the at least one neighbor BS, an interface receiving at least one of a second candidate MS list from the at least one neighbor BS, and an MS selector calculates channel transmission rates of candidate MSs included in the first candidate MS lists and the at least one of the second candidate MS list and selects at least one MS to be serviced according to the channel transmission rates.

BRIEF DESCRIPTION OF THE DRAWINGS

The above and other objects, features and advantages of certain exemplary embodiments of the present invention will be more apparent from the following detailed description taken in conjunction with the accompanying drawings, in which.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention provides an apparatus and method for scheduling MSs, taking into account multi-cell interference in a mobile communication system.

Figure 1A:
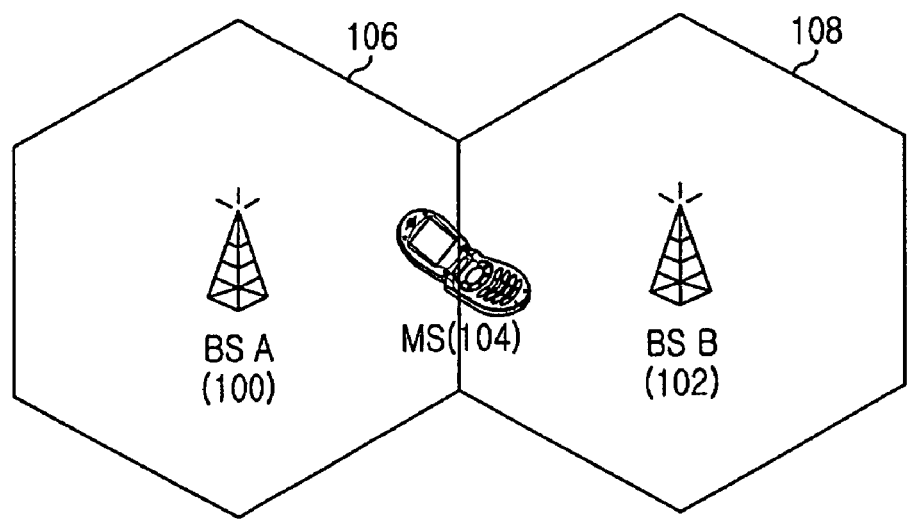
FIGS. 1A and 1B illustrate exemplary MSs that encounter interference caused by signals from neighbor BSs in a mobile communication system.
Figure 1B:
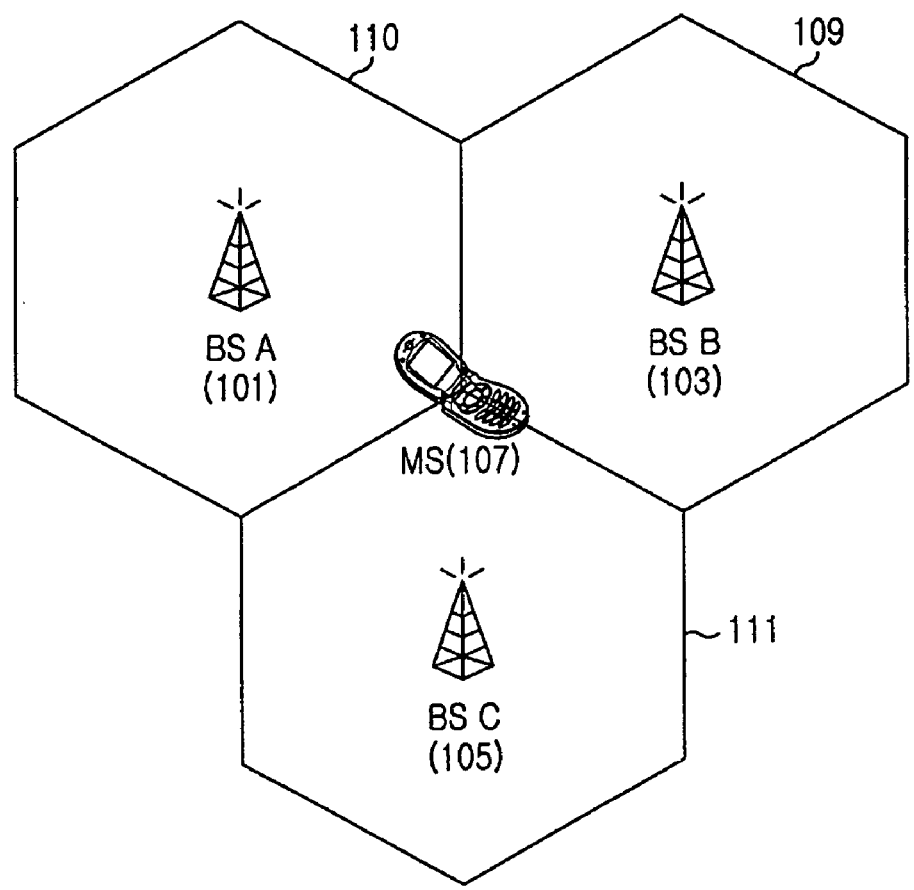
Figure 2:
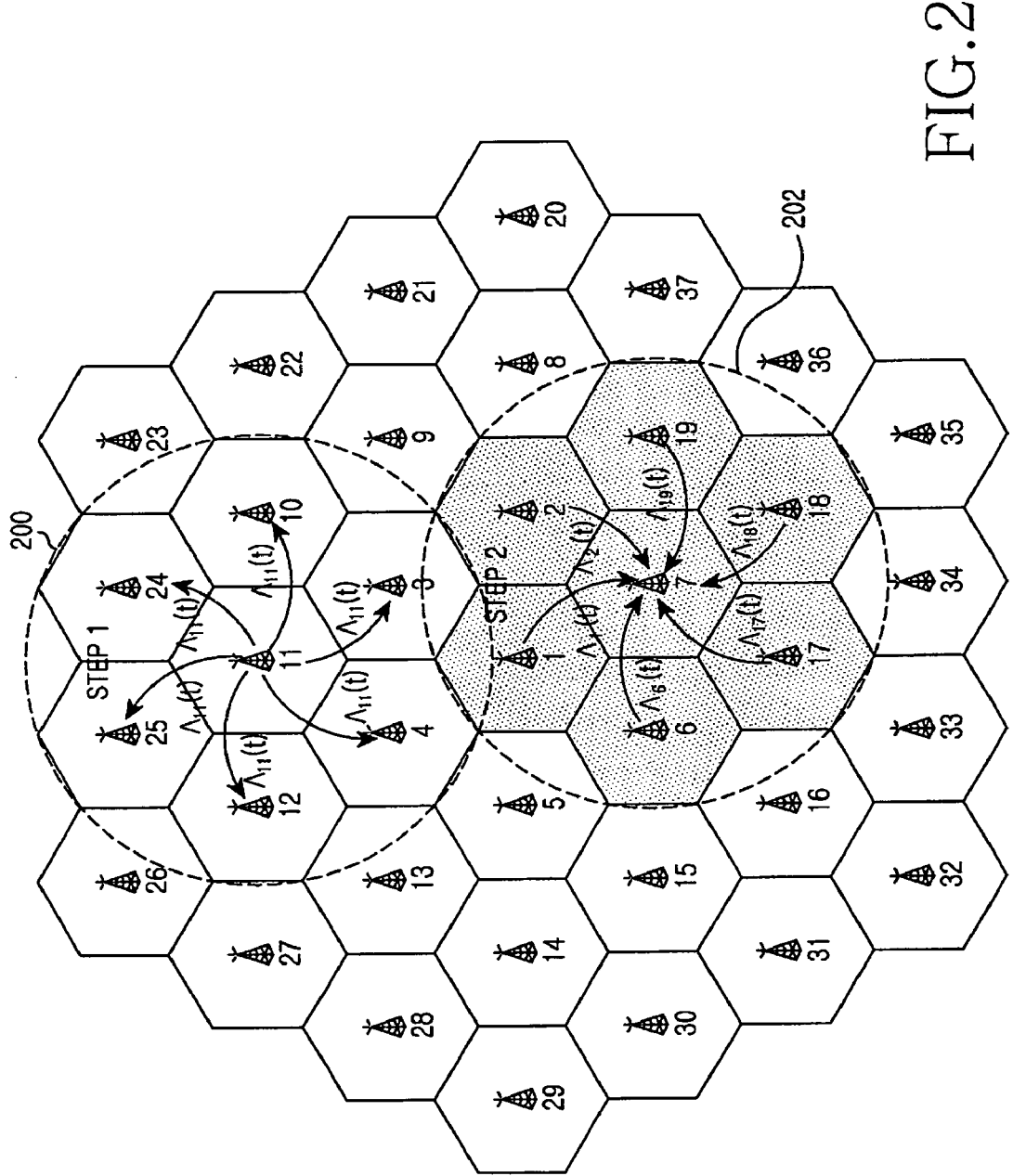
FIG. 2 illustrates a mobile communication system for scheduling MSs, taking into account interference from neighbor cells according to an exemplary embodiment of the present invention.

FIG. 2 illustrates a mobile communication system for scheduling MSs, taking into account interference from neighbor cells according to an exemplary embodiment of the present invention.

Referring to FIG. 2, there are 39 hexagonal cells. A BS 11 calculates a utility function for selecting candidate MSs in order to schedule MSs taking into account interference from neighbor BSs 3, 4, 10, 12, 24 and 25. The utility function is defined by a parameter representing path losses between the candidate MSs and the BS 11 and path losses between the candidate MSs and the neighbor BSs 3, 4, 10, 12, 24 and 25, and a transmission rate parameter. After selecting candidate MSs within its service area using the utility function, the BS 11 transmits candidate MS information $\Lambda_{11}(t)$ to the neighbor BSs 3, 4, 10, 12, 24 and 25 in areas 200 Notably, the BS 11 selects the candidate MSs based on fairness and inter-cell interference.

Meanwhile, a BS 7 receives candidate MS information $\Lambda_1(t)$, $\Lambda_2(t)$, $\Lambda_6(t)$, $\Lambda_{17}(t)$, $\Lambda_{18}(t)$ and $\Lambda_{19}(t)$ from neighbor BSs 1, 2, 6, 17, 18 and 19 in step 202, for scheduling MSs based on interference from the neighbor BSs 1, 2, 6, 17, 18 and 19. While areas 200 and 202 are separate herein, a BS should be able to transmit its candidate MS information and receive candidate MS information from its neighbor BSs The BS can transmit the candidate MS information to the neighbor BSs directly or via a backbone network depending on system configuration. Also, the BS can receive the candidate MS information from the neighbor BSs directly or via the backbone network depending on system configuration.

Then, the BS calculates the real-time transmission rates of its candidate MSs using the candidate MS information of the BS and the candidate MS information of the neighbor BSs. The BS finally selects an MS to be scheduled using the real-time transmission rates of the candidate MSs.

The present invention is based on the following four premises.

(1) Let a set of BSs be denoted by $SetN=\{1, \ldots, N\}$ and a set of MSs be denoted by $SetK=\{1, \ldots, K\}$. In other words, there are N BSs and K MSs in the multi-cellular mobile communication system.

(2) One MS has already registered to one BS by a registration procedure and handover between BSs is not considered herein. Therefore, the set of MSs SetK are distributed over the N BSs, each BS, BS i having a set of MSs $SetK_i$, as shown in Equation 1:

$$\cup_{i \in SetN} SetK_i = SetK \text{ and } SetK_i \cap SetK_j = \{\ \} \tag{1}$$

where $SetK_i$, denotes the set of MSs in BS i and SetK denotes the set of all MSs included in the N BSs. $SetK_i \cap SetK_j$ denotes the intersection set between the set of MSs located in BS i and the set of MSs located in BS j.

For example, the condition that there are no common elements in MS sets, $SetK_i$ means that one MS is not registered to a plurality of BSs at the same time. The condition that the sum of the sets of MSs $SetK_i$ is SetK means that one MS is registered to one BS. For a K×N matrix $I(t)=\{I_{kn}(t)\}$, it is said that if BS n schedules MS k, $I_{kn}(t)=1$ and if BS n does not schedule MS k, $I_{kn}(t)=0$. That is, $I(t)=\{I_{kn}(t)\}$ is a scheduled MS indicator indicating an MS to be scheduled for time slot (t) by each BS.

(3) Let a transmit power of a BS be denoted by $p_n(t)$ and a maximum transmit power of the BS be denoted by $\bar{p}$. It is assumed that $0 \leq p_n(t) \leq \bar{p}$. If $p_n(t)$ can be any value between 0 and $\bar{p}$, computation complexity is very high. Thus, $p_n(t)$ is assumed to be either 0 or $\bar{p}$, which is equivalent to binary power control. In the present invention, the case where $p_n(t)=0$ is allowed to reduce performance degradation caused by inter-cell interference. Thus, if $$\sum_{k \in SetK_n} I_{kn}(t) = 0,$$

this implies that BS n schedules none of the MSs of the set $SetK_n$.

(4) A BS set including BS n and its neighbor BSs is denoted by $\overline{SetN_n}$. For example, when six neighbor cells exist around BS n in the multi-cellular mobile communication system with hexagonal cells (see FIG. 2), the set of BS n and the six neighbor BSs is represented as $\overline{SetN_n}$ and the BS set $\overline{SetN_n}$ has seven elements.

Figure 3:
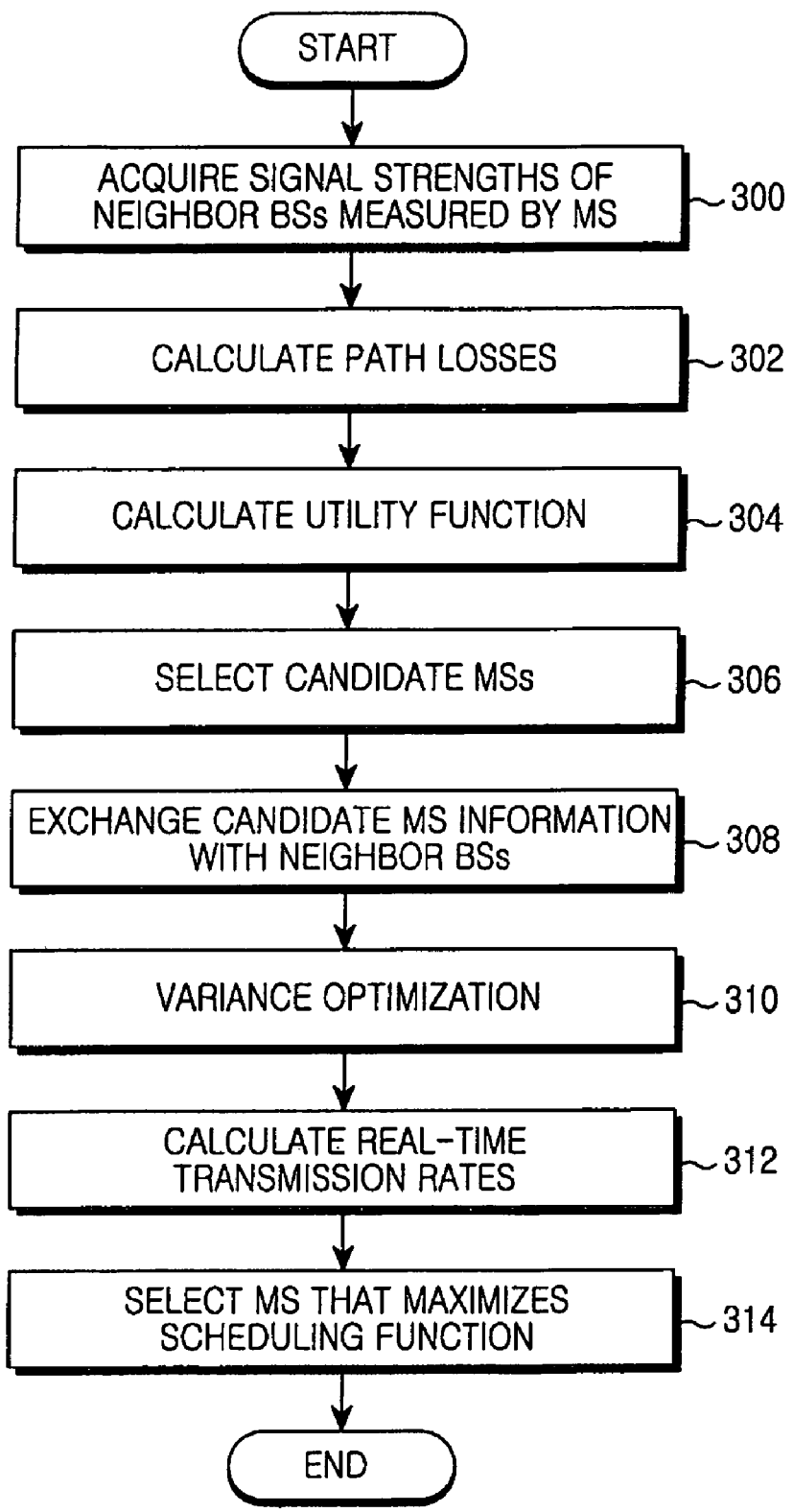
FIG. 3 is a flowchart of an operation of a BS for scheduling MSs in the mobile communication system according to an exemplary embodiment of the present invention.

FIG. 3 is a flowchart of an operation of a BS for scheduling MSs in the mobile communication system according to an exemplary embodiment of the present invention.

Referring to FIG. 3, the BS periodically, or in an event-driven manner, receives report messages with neighbor BS information from MSs, thereby acquiring information about neighbor BSs around the MSs in step 300. The neighbor BS information further includes the strengths of signals from the neighbor BSs measured at the MSs.

The BS calculates all path losses between the MSs and their neighbor BSs using the signal strengths of the neighbor BSs in step 302. The path losses are calculated based on the correlation between the transmit power of the neighbor BSs and the reception sensitivities of the MSs.

In step 304, for each of the MSs, the BS calculates a utility function designed for selecting candidate MSs using the path losses and the average transmission rate of the MS as shown in Equation 2:

$$\Delta U_k^j(t) = \frac{w_k}{[\bar{r}_k(t-1)]^\alpha} \cdot C\left(\frac{\bar{p} \cdot g_{kn}(t)}{\sigma_k^2 + \bar{p} \cdot \sum_{kn}^{j}(t)}\right) \quad (2)$$

where $\Delta U_k^j(t)$ denotes the utility function of MS k when j≠n and BS j being one of the neighbor BSs of BS n does not output transmit power, $\Delta U_k^n(t)$ denotes the utility function of MS k when j=n and all the neighbor BSs of BS n output transmit power, $\bar{r}_k(t-1)$ denotes the average transmission rate of MS k at time (t−1) (see Equation (3)), $w_k$ denotes a weight value that differentiates the QoS of MS k (if the MSs have the same QoS requirement, $w_k=1$ for every MS), $\alpha$ denotes a parameter for controlling fairness and transmission rate in a scheduler, $C(\cdot)$ denotes a normalized channel capacity function having a Signal-to-Interference and Noise Ratio (SINR) as its input, and $\sigma_k^2$ denotes the thermal noise of MS k, which can be equal for every MS ($\sigma_k^2$ can be replaced with $\sigma$, i.e. $\sigma_k^2 = \sigma$). The numerator and denominator of $C(\cdot)$ represent the signal power between BS n and MS k and the sum of the thermal noise and the interference signal power from other BSs to MS k, respectively. $\bar{p}$ denotes the maximum transmit power of BS j, and $g_{kn}(t)$ denotes the path loss between BS n and MS k, reflecting fading caused by the mobility of MS k and signal attenuation caused by the distance between BS n and MS $$k \cdot \sum_{kn}^{j}(t)$$

is the sum of the path losses between MS k and the neighbor BSs.

The average transmission rate of MS k at time (t−1) is computed by Equation 3:

$$\bar{r}_k(t-1) = \frac{1}{t-1}\sum_{\tau=1}^{t-1} r_k(t-1) \quad (3)$$

where $\bar{r}_k(t-1)$ denotes the average transmission rate of MS k at time (t−1) and $r_k(t-1)$ denotes the real-time channel transmission rate of MS k at time (t−1).

$$\sum_{kn}^{j}(t) \text{ is given as Equation 4:} \quad (4)$$

$$\sum_{kn}^{j}(t) = \begin{cases} \sum_{\substack{i \in SetN \\ i \neq n}} g_{ki}(t), & \text{if } j = n; \\ \sum_{\substack{i \in SetN \\ i \neq n \\ i \neq j}} g_{ki}(t), & \text{otherwise} \end{cases}$$

where $g_{ki}$ denotes the path loss between BS i and MS k. If j=n, which means that all neighbor BSs around BS n output transmit power, $$\sum_{kn}^{j}(t)$$

in the sum of the path losses between MS k and all neighbor BSs except for BS n. If j≠n, which means that all neighbor BSs except for neighbor BS j output transmit power, $$\sum_{kn}^{j}(t)$$

is the sum of the path losses between MS k and all neighbor BSs except for BS n and neighbor BS j.

According to Equation (2), therefore, MS k within BS n has a total of seven utility values for the cases where each of the neighbor BSs does not provide a service and the case where all the neighbor BSs provide the service.

In step 306, the BS selects candidate MSs using the utility function. The utility function considers the average transmission rate of MS k within BS n and the path losses between MS k and the neighbor BSs. For example, if the neighbor BSs severely interfere with MS k, the utility value of MS k decreases, thus excluding MS k from the candidate MS set. In an opposite case, when MS k is out of the candidate MS set, MS k's average transmission rate decreases. Due to the decreased transmission rate, the utility value of MS k increases, thus including MS k in the candidate MS set. Therefore, the utility function subjects MS k to fair scheduling without neighbor-cell interference.

BS n selects a set of seven candidate MSs $\Lambda_n(t)$, as in Equation 5:

$$\Lambda_n(t) = \left\{ K_n^j(t) \mid K_n^j(t) = \underset{k \in SetK_n}{\mathrm{argmax}}\, \Delta U_k^j(t),\ j \in \overline{SetN_n} \right\} \quad (5)$$

where $\Lambda_n(t)$ is the set of MSs that maximize $\Delta U_k^j(t)$, $\overline{SetN_n}$ is the set of BS n and its six neighbor BSs, and j denotes an element of the BS set $\overline{SetN_n}$. Hence, assuming that the number of the elements of the BS set $\overline{SetN_n}$ is $|\overline{SetN_n}|$ and the number of the elements of the candidate MS set $\Lambda_n(t)$ is $|\Lambda_n(t)|$, $|\Lambda_n(t)| \leq |\overline{SetN_n}|$. Also, if the number of the elements of $\overline{SetK_n}$ is $|\overline{SetK_n}|$, $|\Lambda_n(t)| \leq |\overline{SetK_n}|$. Accordingly, no matter how large $SetK_n$ is, $|\Lambda_n(t)|$ is appropriately limited. That is, no matter how many MSs each BS has, $|\Lambda_n(t)|$ is limited by Equation 6:

$$|\Lambda_n(t)| \leq \min\{|\overline{SetN_n}|, |SetK_n|\} \quad (6)$$

where $|\Lambda_n(t)|$ is the number of MSs maximizing $\Delta U_k^j(t)$, $|\overline{SetN_n}|$ is the number of the elements of the BS set $\overline{SetN_n}$, and $|SetK_n|$ is the number of the elements of the MSs included in BS n. That is, the number of the elements of the candidate MS set in BS n is equal to or less than the total number of BS n and its neighbor BSs and is also equal to or less than that of the MSs located in BS n. Depending on system configuration, a predetermined number of MSs are selected as candidate MSs in a descending order of utility value.

In step 308, the BS exchanges candidate MS information with the neighbor BSs. Specifically, BS n transmits its candidate MS information $\Lambda_n(t)$ to its neighbor BSs over an upper-layer network entity (e.g. a backhaul network). Depending on system configuration, the candidate MS information $\Lambda_n(t)$ can be exchanged directly among the BSs.

In this manner, all of the BSs have $|\overline{SetN_n}|$ candidate MS sets. That is, BS n has the following candidate MS sets, as shown in Equation 7:

$$\Lambda_j(t), j \in \overline{SetN_n} \qquad (7)$$

That is, BS n has the candidate MS information of its neighbor BSs as well as its candidate MS information.

In step 310, the BS performs variance optimization. The variance optimization allows each BS to receive candidate MS information from only the six BSs neighboring the BS. For this purpose, the following are assumed in Equation 8:

$$SetN \overset{?}{\to} \overline{SetN_n}, SetK_j \to \Lambda_j(t) \text{ for } j \in \overline{SetN_n}, p_n(t) = \overline{p} \text{ for } j \notin \overline{SetN_n} \qquad (8)$$

As noted from Equation (8), each BS assumes that the set of BSs in the multi-cellular mobile communication system, SetN is equal to $\overline{SetN_n}$, and the set of MSs within the BS, $SetK_j$ is equal to $\Lambda_j(t)$. If j denotes a neighbor BS, BS n receives candidate MS information $\Lambda_j(t)$ from neighbor BS j. If j denotes BS n, BS n uses its candidate MS information $\Lambda_n(t)$. It is assumed that the other BSs that are not included in $\overline{SetN_n}$ output transmit power $\overline{p}$.

In step 312, the BS calculates the real-time channel transmission rate of MS k using the scheduled MS indicator and the path losses between MS k and the neighbor BSs by Equation (9).

$$r_k(t) = B \sum_{n \in SetN} C\left( \frac{\overline{p} \cdot g_{kn}(t) \cdot I_{kn}(t)}{\sigma_k^2 + \sum_{\substack{i \in SetN \\ i \neq n}} \overline{p} \cdot g_{ki}(t) \cdot I_i(t)} \right) \qquad (9)$$

where $r_k(t)$ denotes the real-time channel transmission rate of MS k at time t, B denotes a frequency bandwidth, $C(\cdot)$ denotes the normalized channel capacity function having an SINR as its input, $\overline{p}$ denotes the maximum transmit power of a BS, $\sigma_k^2$ denotes the thermal noise of MS k, $g_{kn}(t)$ denotes the path loss between BS n and MS k, $g_{ki}(t)$ denotes the path loss between BS i and MS k, and $I_{kn}(t)$ is the scheduled MS indicator indicating an MS to be scheduled. $I_{kn}(t)$ should satisfy Equation 10:

$$I_{kn}(t) = 0 \text{ if } k \notin SetK_n \qquad (10)$$

Thus, when BS n schedules MS k, $I_{kn}(t)=1$ and when BS n does not schedule MS k, $I_{kn}(t)=0$.

$I_i(t)$ denotes a variable indicating the on/off status of the transmit power of a neighbor BS. For example, if $I_i(t)=1$, BS i is in the on state and thus outputs transmit power $(p_n(t)=\overline{p})$ and if $I_i(t)=0$, BS i is in the off state and thus does not output transmit power $(p_n(t)=0)$.

In step 314, the BS calculates a scheduling function using the real-time transmission rates and average transmission rates of the candidate MSs to select an MS to be served. Although the BS schedules for every time slot, if the MSs experience relatively slow fading, it may schedule for every predetermined number of time slots.

The scheduling function is Equation 11:

$$\max_{I_{kn}(t)} \sum_{k \in SetK} \frac{w_k r_k(t)}{[\overline{r}_k(t-1)]^\alpha} \qquad (11)$$

where $r_k(t)$ denotes the real-time transmission rate of MS k at time t computed by Equation (3), $\overline{r}_k(t-1)$ denotes the average transmission rate of MS k at time (t−) computed by Equation (9), and $w_k$ denotes the weight value for differentiating the QoS of MS k.

As described above, the BS selects the candidate MSs, taking into account all of the transmit power statuses of the BS and its neighbor BSs. Therefore, the computation volume of scheduling increases. The following utility function is presented to reduce the computation volume, as in Equation 12:

$$\Lambda_n(t) = \left\{ K_n^n(t) = \operatorname*{argmax}_{k \in SetK_n} \Delta U_k^n(t), K_n^{all}(t) = \operatorname*{argmax}_{k \in SetK_n} \Delta U_k^{all}(t) \right\} \qquad$$

where $\Lambda_n(t)$ denotes a candidate MS set including an MS that maximizes the utility function $\Delta U_k^{all}(t)$ when there is no interference from the neighbor BSs and an MS that maximizes the utility function $\Delta U_k^n(t)$ when all the neighbor BSs output transmit power and thus there is maximum interference from the neighbor BSs.

When there is no interference from the neighbor BSs, the utility function $\Delta U_k^{all}(t)$ is expressed as Equation 13:

$$\Delta U_k^{all}(t) = \frac{w_k}{[\overline{r}_k(t-1)]^\alpha} \cdot C\left( \frac{\overline{p} \cdot g_{kn}(t)}{\sigma_k^2} \right) \qquad (13)$$

where $\overline{r}_k(t-1)$ denotes the average transmission rate of MS k at time (t−1), $w_k$ denotes the weight value for differentiating the QoS of MS k, $\alpha$ denotes the parameter for controlling fairness and transmission rate in the scheduler, $C(\cdot)$ denotes the normalized channel capacity function having an SINR as its input, $\overline{p}$ denotes the maximum transmit power of BS n, $g_{kn}(t)$ denotes the path loss between BS n and MS k, and $\sigma_k^2$ denotes the thermal noise of MS k.

Therefore, the candidate MS set $\Lambda_n(t)$ selected for all cases of the transmit power statuses of the neighbor BSs according to Equation (2) has up to seven elements, whereas the candidate MS set $\Lambda_n(t)$ selected for both cases where there is neighbor-cell interference and there is no neighbor-cell interference according to Equation (12) has up to two elements (if $K_n^n(t)=K_n^{all}(t)$, $\Lambda_n(t)$ includes only one element). As a consequence, Equation (12) is far less complex than Equation (4).

Figure 4:
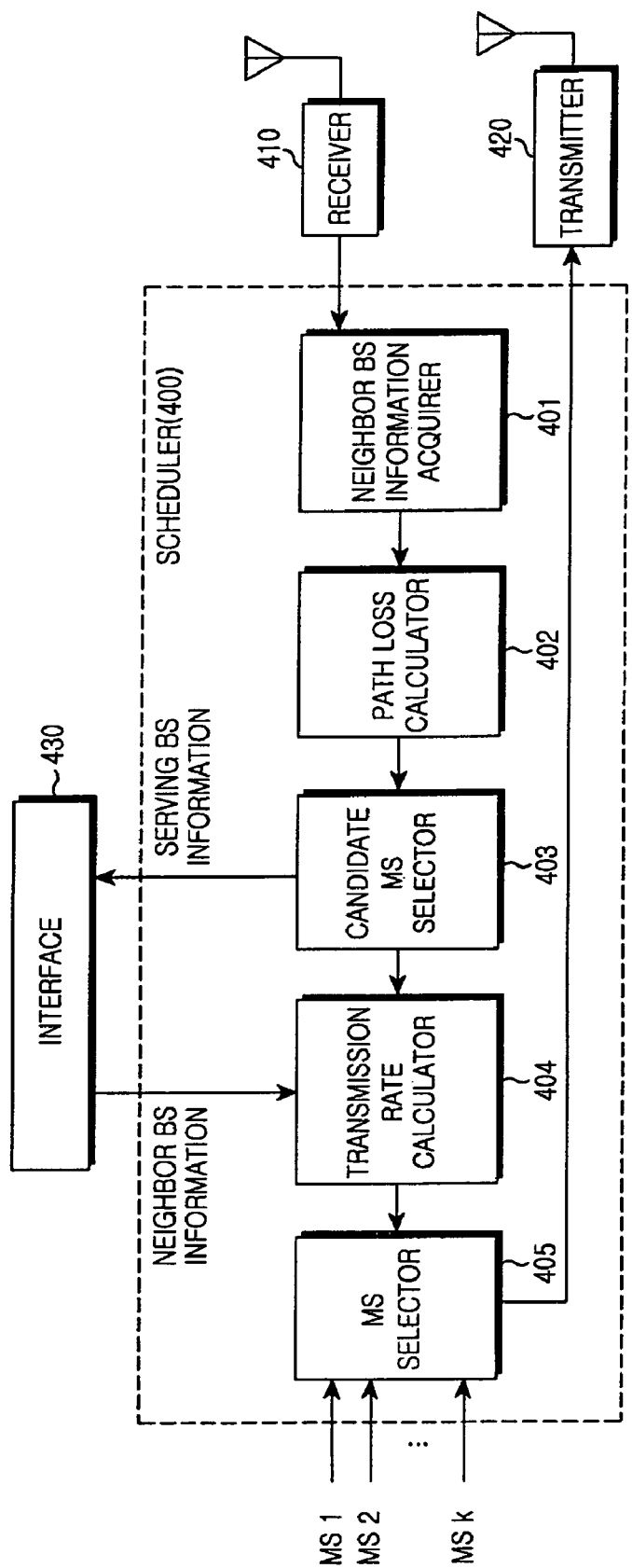
FIG. 4 is a block diagram of a scheduling apparatus of the BS in the mobile communication system according to an exemplary embodiment of the present invention.

FIG. 4 is a block diagram of a scheduling apparatus of the BS in the mobile communication system according to an exemplary embodiment of the present invention.

Referring to FIG. 4, the BS includes a scheduler 400, a receiver 410, a transmitter 420, and an interface 430, for scheduling. The scheduler 400 has a neighbor BS information acquirer 401, a path loss calculator 402, a candidate MS selector 403, a transmission rate calculator 404, and an MS selector 405, for user scheduling.

The receiver 410 receives data from an MS on a radio channel, demodulates the data, and decodes the demodulated data. In the present invention, the receiver 410 receives a report message including neighbor BS information periodically or in an event-triggered manner from the MS.

The neighbor BS information acquirer 401 processes the report message and provides the signal strengths of neighbor BSs measured at the MS to the path loss calculator 402.

The path loss calculator 402 calculates path losses between the MS and the neighbor BSs using the signal strength measurements. The path losses are derived from the correlation between the transmit power of the neighbor BSs and the reception sensitivities of the MS.

The candidate MS selector 403 calculates a utility function using the path loses by Equation (2) and selects candidate MSs by Equation (5) taking into account neighbor-cell interference and fairness. The BS transmits the candidate MS information to the neighbor BSs through the interface 430 that connects the BS to an upper-layer network entity (e.g. Mobile Switching Center (MS) or Base Station Controller (BSC)). The utility function can be for all cases of the transmit power statuses of the neighbor BSs as illustrated in Equation (2) or for two cases of neighbor-BS interference and no neighbor-BS interference as illustrated in Equation (13). For this purpose, the candidate MS selector 403 can consider information about only six neighbor BSs through variance optimization of the MSs listed in the exchanged candidate MS set.

The transmission rate calculator 404 calculates the transmission rates of the candidate MSs by Equation (9) using the candidate MS information received from the candidate MS selector 403 and the candidate MS information received from the neighbor BSs through the interface 430.

The MS selector 405 selects an MS that maximizes the scheduling function described as Equation (11) based on the transmission rates of the candidate MSs and provides data for the selected MS to the transmitter 420. The MS selector 405 considers all cases of the scheduled MS indicator $I_{kn}$ referring to the candidate MS information of the BS and the neighbor BSs in selecting the MS to be served. For example, if the candidate MS selector 403 selects seven candidate MSs from among which one MS is selected, there are eight cases, specifically, seven cases where each of the seven candidate MSs is serviced and one case where none of the candidate MSs are serviced. Considering the neighbor BSs, a total of 2097152 ($8^7$) cases should be taken into account.

The transmitter 420 encodes and modulates the data for the selected MS and transmits the modulated data to the selected MS on a radio channel.

As is apparent from the above description, the present invention advantageously reduces a QoS decrease caused by neighbor-cell interference, while supporting fairness by scheduling MSs considering multi-cell interference in a mobile communication system.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A scheduling method of a Base Station (BS) in a mobile communication system, the method comprising:
    calculating scheduling utility values of each Mobile Station (MS), based on interference from at least one neighbor BS and an average transmission rate of each MS;
    forming a first candidate MS list by selecting a predetermined number of MSs according to a utility value based on the interference from the at least one neighbor BS and the average transmission rate of each MS;
    receiving a second candidate MS list from the at least one neighbor BS;
    calculating channel transmission rates of candidate MSs included in the first candidate MS list and the second candidate MS list; and
    selecting at least one MS maximizing the channel transmission rates,
    wherein if the interference from the neighbor BSs are where one of the neighbor BSs does not interfere and where all of the neighbor BSs interfere, the scheduling utility values calculation comprises calculating the scheduling utility values by $$\Delta U_k^j(t) = \frac{w_k}{[\bar{r}_k(t-1)]^\alpha} \cdot C\left(\frac{\bar{p} \cdot g_{kn}(t)}{\sigma_k^2 + \bar{p} \cdot \sum_{kn}^j (t)}\right)$$

where $\Delta U_k^j(t)$ denotes a utility function for selecting the candidate MSs, $\bar{r}_k(t-1)$ denotes an average transmission rate of an MS k at a time (t-1), $w_k$ denotes a weight value that differentiates a Quality of Service (QoS) of MS k, $\alpha$ denotes a parameter for controlling fairness and a transmission rate in a scheduler, $C(\cdot)$ denotes a normalized channel capacity function having an Signal-to-Interference and Noise Ratio (SINR) as an input, $\bar{p}$ denotes a maximum transmit power of a BS j, $\sigma_k^2$ denotes the thermal noise of MS k, and $g_{kn}(t)$ denotes a path loss between a BS n and the MS k, and $$\sum_{kn}^j (t)$$

is a sum of path losses between the MS k and neighbor BSs.

2. The scheduling method of claim 1, wherein the interference from the neighbor BSs are where one of the neighbor BSs does not interfere and where all of the neighbor BSs interfere.

3. The scheduling method of claim 1, wherein the sum of the path losses between MS k and the neighbor BSs is calculated by $$\sum_{kn}^j (t) = \begin{cases} \sum_{\substack{i \in SetN \\ i \neq n}} g_{ki}(t), & \text{if } j = n; \\ \sum_{\substack{i \in SetN \\ i \neq n \\ i \neq j}} g_{ki}(t), & \text{otherwise} \end{cases}$$

where n denotes an index of a serving BS, j denotes an index of a neighbor BS, SetN denotes a set of all BSs, and $g_{ki}$ denotes a path loss between a BS i and an MS k.

4. The scheduling method of claim 1, wherein the interference from the neighbor BSs are where all of the neighbor BSs interfere and where none of the neighbor BSs interfere.

5. The scheduling method of claim 4, wherein if the interference from the neighbor BSs are where all of the neighbor BSs interfere and where none of the neighbor BSs interfere, the scheduling utility value calculation comprises calculating the scheduling utility values by $$\Delta U_k^{all}(t) = \frac{w_k}{[\bar{r}_k(t-1)]^\alpha} \cdot C\left(\frac{\bar{p} \cdot g_{kn}(t)}{\sigma_k^2}\right)$$

$$\Delta U_k^n(t) = \frac{w_k}{[\bar{r}_k(t-1)]^\alpha} \cdot C\left(\frac{\bar{p} \cdot g_{kn}(t)}{\sigma_k^2 + \bar{p} \cdot \sum_k^n (t)}\right)$$

where $\Delta U_k^{all}(t)$ denotes a utility function when none of the neighbor BSs provide a service, $\Delta U_k^n(t)$ denotes a utility function when all of the neighbor BSs provide the service, $\bar{r}_k(t-1)$ denotes the average transmission rate of an MS k at time (t−1), $w_k$ denotes a weight value that differentiates a Quality of Service (QoS) of the MS k, α denotes a parameter for controlling fairness and transmission rate in a scheduler, $C(\cdot)$ denotes a normalized channel capacity function having an SINR as an input, $\bar{p}$ denotes a maximum transmit power of a BS, $\sigma_k^2$ denotes a thermal noise of the MS k, and $g_{kn}(t)$ denotes a path loss between a BS n and the MS k, and is a sum of path losses between the MS k and neighbor BSs.

6. The scheduling $$\sum_k^n (t)$$

method of claim 1, further comprising acquiring interference caused by the neighbor BSs to the each MS.

7. The scheduling method of claim 1, wherein the selection of an MS to be serviced comprises selecting an MS to be serviced by $$\max_{I_{kn}(t)} \sum_{k \in SetK} \frac{w_k r_k(t)}{[\bar{r}_k(t-1)]^\alpha}$$

where $r_k(t)$ denotes a real-time transmission rate of an MS k at a time t, $\bar{r}_k(t-1)$ denotes an average transmission rate of the MS k at a time (t−1), and $w_k$ denotes a weight value for differentiating QoS of the MS k.

8. The scheduling method of claim 7, wherein the channel transmission rate is computed by $$r_k(t) = B \sum_{n \in SetN} C\left(\frac{\bar{p} \cdot g_{kn}(t) \cdot I_{kn}(t)}{\sigma_k^2 + \sum_{\substack{i \in SetN \\ i \neq n}} \bar{p} \cdot g_{ki}(t) \cdot I_i(t)}\right)$$

where $r_k(t)$ denotes a channel transmission rate of MS k at time t, B denotes a frequency bandwidth, $C(\cdot)$ denotes a normalized channel capacity function having an SINR as an input, $\bar{p}$ denotes a maximum transmit power of a BS, $\sigma_k^2$ denotes a thermal noise of the MS k, $g_{kn}(t)$ denotes a path loss between a BS n and the MS k, $g_{ki}(t)$ denotes a path loss between a BS i and the MS k, and $I_{kn}(t)$ is a scheduled MS indicator indicating an MS to be scheduled.

9. The scheduling method of claim 1, wherein only six neighbor BSs around the BS are considered by a variance optimization of the candidate MSs included in the received candidate MS lists.

10. The scheduling method of claim 1, further comprising transmitting the first candidate MS list to the at least one neighbor BS.

11. A scheduling apparatus of a Base Station (BS) in a mobile communication system, the apparatus comprising:

a candidate Mobile Station (MS) selector for calculating scheduling utility values of each MS, based on interference from at least one neighbor BS and an average transmission rate of each MS, and forming a first candidate MS list by selecting a predetermined number of MSs according to a utility value based on the interference from the at least one neighbor BS and the average transmission rate of each MS;

an interface for receiving a second candidate MS list from the at least one neighbor BS; and an MS selector for calculating channel transmission rates of candidate MSs included in the first candidate MS list and the second candidate MS list and selecting at least one MS maximizing the channel transmission rates, wherein if the interference from the neighbor BSs are cases where one of the neighbor BSs does not interfere and a case where all of the neighbor BSs interfere, the candidate MS selector calculates the scheduling utility values by $$\Delta U_k^j(t) = \frac{w_k}{[\bar{r}_k(t-1)]^\alpha} \cdot C\left(\frac{\bar{p} \cdot g_{kn}(t)}{\sigma_k^2 + \bar{p} \cdot \sum_{kn}^j (t)}\right)$$

where $\Delta U_k^j(t)$ denotes a utility function for selecting the candidate MSs, $\bar{r}_k(t-1)$ denotes an average transmission rate of an MS k at a time (t−1), $w_k$ denotes a weight value that differentiates a Quality of Service (QoS) of an MS k, α denotes a parameter for controlling fairness and a transmission rate in a scheduler, $C(\cdot)$ denotes a normalized channel capacity function having a Signal-to-Interference and Noise Ratio (SINR) as an input, $\bar{p}$ denotes a maximum transmit power of a BS j, $\sigma_k^2$ denotes a thermal noise of MS k, and $g_{kn}(t)$ denotes a path loss between a BS n and the MS k, and $$\sum_{kn}^j (t)$$

is a sum of path losses between the MS k and neighbor BSs.

12. The scheduling apparatus of claim 11, wherein the interference from the neighbor BSs are cases where one of the neighbor BSs does not interfere and a case where all of the neighbor BSs interfere.

13. The scheduling apparatus of claim 11, wherein the sum of the path losses between the MS k and the neighbor BSs is calculated by $$\sum_{kn}^j (t) = \begin{cases} \sum_{\substack{i \in SetN \\ i \neq n}} g_{ki}(t), & \text{if } j = n; \\ \sum_{\substack{i \in SetN \\ i \neq n \\ i \neq j}} g_{ki}(t), & \text{otherwise} \end{cases}$$

where n denotes an index of a serving BS, j denotes an index of a neighbor BS, SetN denotes a set of all BSs, and $g_{ki}$ denotes a path loss between a BS i and the MS k.

14. The scheduling apparatus of claim 11, wherein the interference from the neighbor BSs are where all of the neighbor BSs interfere and where none of the neighbor BSs interfere.

15. The scheduling apparatus of claim 14, wherein if the interference from the neighbor BSs are where all of the neighbor BSs interfere and where none of the neighbor BSs interfere, the candidate MS selector calculates the scheduling utility values by $$\Delta U_k^{all}(t) = \frac{w_k}{[\bar{r}_k(t-1)]^\alpha} \cdot C\left(\frac{\bar{p} \cdot g_{kn}(t)}{\sigma_k^2}\right)$$

$$\Delta U_k^n(t) = \frac{w_k}{[\bar{r}_k(t-1)]^\alpha} \cdot C\left(\frac{\bar{p} \cdot g_{kn}(t)}{\sigma_k^2 + \bar{p} \cdot \Sigma_k^n(t)}\right)$$

where $\Delta U_k^{all}(t)$ denotes a utility function when none of the neighbor BSs provide a service, $\Delta U_k^n(t)$ denotes a utility function when all of the neighbor BSs provide the service, $\bar{r}_k(t-1)$ denotes an average transmission rate of an MS k at a time (t−1), $w_k$ denotes a weight value that differentiates a Quality of Service (QoS) of the MS k, $\alpha$ denotes a parameter for controlling fairness and a transmission rate in a scheduler, $C(\cdot)$ denotes a normalized channel capacity function having an SINR as an input, $\bar{p}$ denotes a maximum transmit power of a BS, $\sigma_k^2$ denotes a thermal noise of the MS k, and $g_{kn}(t)$ denotes a path loss between a BS n and the MS k, and $$\sum_{k}^{n}(t)$$

is a sum of path losses between the MS k and neighbor BSs.

16. The scheduling apparatus of claim 11, further comprising a neighbor BS information acquirer for acquiring interference caused by the neighbor BSs to the each MS.

17. The scheduling apparatus of claim 11, wherein the MS selector selects the MS to be serviced by $$\max_{I_{kn}(t)} \sum_{k \in SetK} \frac{w_k r_k(t)}{[\bar{r}_k(t-1)]^\alpha}$$

where $r_k(t)$ denotes a real-time transmission rate of an MS k at a time t, $\bar{r}_k(t-1)$ denotes an average transmission rate of the MS k at the time (t−1), and $w_k$ denotes a weight value for differentiating a QoS of the MS k.

18. The scheduling apparatus of claim 17, wherein the channel transmission rate is computed by $$r_k(t) = B \sum_{n \in SetN} C\left(\frac{\bar{p} \cdot g_{kn}(t) \cdot I_{kn}(t)}{\sigma_k^2 + \sum_{\substack{i \in SetN \\ i \neq n}} \bar{p} \cdot g_{ki}(t) \cdot I_i(t)}\right)$$

where $r_k(t)$ denotes a channel transmission rate of the MS k at a time t, B denotes a frequency bandwidth, $C(\cdot)$ denotes a normalized channel capacity function having an SINR as an input, $\bar{p}$ denotes a maximum transmit power of a BS, $\sigma_k^2$ denotes a thermal noise of the MS k, $g_{kn}(t)$ denotes a path loss between a BS n and the MS k, $g_{ki}(t)$ denotes a path loss between a BS i and the MS k, and $I_{kn}(t)$ is a scheduled MS indicator indicating an MS to be scheduled.

19. The scheduling apparatus of claim 11, wherein the candidate MS selector considers only six neighbor BSs around the BS by a variance optimization of the candidate MSs included in the received candidate MS lists.

20. The scheduling apparatus of claim 11, wherein the interface transmits the first candidate MS list to the at least one neighbor BS.

* * * * *